(12) United States Patent
Dong et al.

(10) Patent No.: US 9,391,340 B2
(45) Date of Patent: Jul. 12, 2016

(54) ELECTROLYTE FOR REDOX FLOW BATTERY AND REDOX FLOW BATTERY

(71) Applicant: Sumitomo Electric Industries, Ltd., Osaka-shi (JP)

(72) Inventors: Yongrong Dong, Osaka (JP); Ryojun Sekine, Osaka (JP); Hirokazu Kaku, Osaka (JP); Michiru Kubata, Osaka (JP)

(73) Assignee: Sumitomo Electric Industries, Ltd., Osaka-shi (JP)

( * ) Notice: Subject to any disclaimer, the term of this patent is extended or adjusted under 35 U.S.C. 154(b) by 0 days.

(21) Appl. No.: 14/422,785

(22) PCT Filed: Aug. 7, 2013

(86) PCT No.: PCT/JP2013/071427
§ 371 (c)(1),
(2) Date: Feb. 20, 2015

(87) PCT Pub. No.: WO2014/203410
PCT Pub. Date: Dec. 24, 2014

(65) Prior Publication Data
US 2015/0228997 A1    Aug. 13, 2015

(30) Foreign Application Priority Data

Jun. 21, 2013 (JP) .................................. 2013-131101

(51) Int. Cl.
*H01M 8/20* (2006.01)
*H01M 8/18* (2006.01)

(52) U.S. Cl.
CPC *H01M 8/20* (2013.01); *H01M 8/18* (2013.01); *H01M 8/188* (2013.01); *Y02E 60/528* (2013.01)

(58) Field of Classification Search
CPC ................................. H01M 8/188; H01M 8/20
See application file for complete search history.

(56) References Cited

U.S. PATENT DOCUMENTS 4,874,483 A    10/1989    Wakabayashi et al.
5,587,132 A    12/1996    Nakajima et al.
(Continued)

FOREIGN PATENT DOCUMENTS

CN    1515045 A    7/2004
EP    0713257 A1    5/1996
(Continued)

OTHER PUBLICATIONS

Notification of the Office Action issued in Taiwanese Patent Application No. 103127093, dated Mar. 23, 2015.
(Continued)

*Primary Examiner* — Ula C Ruddock
*Assistant Examiner* — Thomas Parsons
(74) *Attorney, Agent, or Firm* — Venable LLP; Michael A. Sarton; David M. Kleeyngier (57) ABSTRACT

Provided are an electrolyte for a redox flow battery, the electrolyte allowing suppression of generation of hydrogen during a battery reaction; and a redox flow battery including the electrolyte. In the electrolyte for a redox flow battery, the total concentration of platinum-group element ions is 4.5 mass ppm or less. The platinum-group element ions may satisfy in terms of concentration at least one of those described below: the concentration of rhodium ions is 1 mass ppm or less, the concentration of palladium ions is 1 mass ppm or less, the concentration of iridium ions is 1 mass ppm or less, and the concentration of platinum ions is 1 mass ppm or less.

10 Claims, 1 Drawing Sheet

(56) References Cited

U.S. PATENT DOCUMENTS

| | | | |
|---|---|---|---|
| 7,258,947 B2* | 8/2007 | Kubata et al. | 429/122 |
| 2004/0191623 A1 | 9/2004 | Kubata et al. | |
| 2010/0143781 A1* | 6/2010 | Keshavarz et al. | 429/107 |
| 2013/0157162 A1 | 6/2013 | Dong et al. | |

FOREIGN PATENT DOCUMENTS

| | | |
|---|---|---|
| EP | 1406333 A1 | 4/2004 |
| JP | 60-115174 | 6/1985 |
| JP | 01-294368 | 11/1989 |
| JP | 03-192662 | 8/1991 |
| JP | 03-192662 B2 | 8/1991 |
| JP | 06-260204 | 9/1994 |
| JP | 08-078042 | 3/1996 |
| JP | 08-148177 | 6/1996 |
| JP | 2002-367657 A | 12/2002 |
| JP | 3897544 B2 | 3/2007 |
| JP | 2011-233372 A | 11/2011 |
| JP | 2012-079678 A | 4/2012 |
| KR | 10-2013-0038234 A | 4/2013 |
| TW | 201327993 A1 | 7/2013 |
| WO | WO-2004/099079 A1 | 11/2004 |
| WO | WO-2010/138945 A2 | 12/2010 |
| WO | WO-2010/138945 A3 | 4/2011 |
| WO | WO-2012/132091 A1 | 10/2012 |
| WO | WO-2013/054921 A1 | 4/2013 |

OTHER PUBLICATIONS

Notification of the Office Action issued in Taiwanese Patent Application No. 103127098, dated Mar. 23, 2015.
Notification of the Office Action issued in Taiwanese Patent Application No. 103127100, dated Mar. 23, 2015.
International Preliminary Report on Patentability in International Application No. PCT/JP2013/071425, dated May 1, 2014.
International Search Report in International Application No. PCT/JP2013/071425 dated Nov. 12, 2013.
International Preliminary Report on Patentability in International Application No. PCT/JP2013/071426, dated May 1, 2014.
International Search Report in International Application No. PCT/JP2013/071426 dated Nov. 12, 2013.
Notice of Decision for Patent in Korean Patent Application No. 10-2015-7004129, dated Apr. 6, 2015.
Office Action in U.S. Appl. No. 14/422,797, dated Oct. 21, 2015.
International Preliminary Report on Patentability in PCT International Application No. PCT/JP2013/071427, dated May 1, 2014.
International Search Report in PCT International Application No. PCT/JP2013/071427 dated Nov. 12, 2013.
Chuan, et al., "Solubility of heavy metals in a contaminated soil: Effects of redox potential and pH" (Abstract) Water, Air, and Soil Pollution, Aug. 1996, vol. 90, Issue 3-4, pp. 543-556.
Azaroual, et al., "Solubility of platinum in aqueous solutions at 25C and pHs 4 to 10 under oxidizing conditions," Geochimica et Cosmochimica Acta, Elsevier, 2001, 65, pp. 4453-4466.
Office Action in U.S. Appl. No. 14/422,792, dated Sep. 15, 2015.
Supplementary European Search Report in European Patent Application No. 13887572.9, dated Jul. 2, 2015.
Supplementary European Search Report in European Patent Application No. 13887535.6, dated Jul. 2, 2015.
Communication pursuant to Article 94(3) EPC for European Patent Application No. 13887535.6, dated Jul. 24, 2015.
Supplementary European Search Report for European Patent Application No. 13887472.2, dated Jul. 2, 2015.
Communication pursuant to Article 94(3) EPC for European Patent Application No. 13887472.2, dated Jul. 28, 2015.
Office Action in U.S. Appl. No. 14/422,792, dated Feb. 2, 2016.

\* cited by examiner

ELECTROLYTE FOR REDOX FLOW BATTERY AND REDOX FLOW BATTERY

TECHNICAL FIELD

The present invention relates to an electrolyte for a redox flow battery and a redox flow battery including the electrolyte for a redox flow battery.

BACKGROUND ART

Recently, in order to address global warming, power generation by using natural energy (what is called renewable energy) such as solar photovoltaic power generation and wind power generation has been actively performed throughout the world. Output of this power generation is significantly affected by natural conditions such as the weather. Accordingly, it is predicted that an increase in the ratio of power derived from natural energy to the total output of power generation will cause problems during operation of power systems such as difficulty in maintaining frequencies and voltages. In order to address such problems, large-capacity storage batteries may be installed to achieve, for example, smoothing of output variations and load leveling.

Among large-capacity storage batteries, there is a redox flow battery. The redox flow battery is a secondary battery that includes a battery cell having a positive electrode, a negative electrode, and a membrane interposed therebetween and is configured to be charged and discharged while a positive electrode electrolyte and a negative electrode electrolyte are supplied to the battery cell. In general, such redox-flow-battery electrolytes used for redox flow batteries employ, as an active material, a metal element that undergoes a change in valence by oxidation-reduction. For example, there are an iron ($Fe^{2+}/Fe^{3+}$)—chromium ($Cr^{3+}/Cr^{2+}$)-based redox flow battery employing iron (Fe) ions as a positive electrode active material and chromium (Cr) ions as a negative electrode active material; and a vanadium ($V^{2+}/V^{3+}$—$V^{4+}/V^{5}$)-based redox flow battery employing vanadium (V) ions as active materials for the two electrodes.

CITATION LIST

Patent Literature

PTL 1: Japanese Unexamined Patent Application Publication No. 2011-233372

SUMMARY OF INVENTION

Technical Problem

In general, the higher the energy density of batteries, the more desirable they are. The energy density may be increased by, for example, increasing the solubility of an active material in an electrolyte or increasing an electrolyte utilization, that is, an active material utilization. This utilization denotes a ratio of an available battery capacity (discharge capacity) to a theoretical battery capacity (Ah) of the active material (discharge capacity/theoretical battery capacity). The discharge capacity denotes a difference between a battery capacity at the lowest level of state of charge (SOC) and a battery capacity at the highest level of state of charge.

However, in the case of performing charging so as to maximize the utilization, in other words, in the case of increasing the discharge capacity at the highest level of state of charge, the following problems occur. Typically, a redox flow battery employs aqueous solutions as electrolytes. Accordingly, during battery reactions (in particular, during the end phase of a charge operation), in the negative electrode, a side reaction of decomposing water to generate hydrogen occurs.

This side reaction causes various problems: for example, (1) the side reaction causes current loss (this loss is caused because a quantity of electricity (Ah) supposed to be used for a battery reaction (change in valence) during charging is partially used for another reaction such as decomposition of water), which results in a decrease in the amount of current; (2) the side reaction causes different states of charge between the positive and negative electrodes, which results in a decrease in the available battery capacity; and (3) the side reaction causes deterioration of the electrode, which results in a decrease in battery life. Accordingly, in actual battery operations, the charge cut-off voltage (maximum charge voltage) is set so as to allow battery usage without occurrence of the side reaction. Thus, it is difficult to increase the state of charge to 90% or more.

PTL 1 discloses a vanadium-based redox flow battery in which at least a negative electrode electrolyte contains metal ions having a lower potential than vanadium ions. In this redox flow battery, during the end phase of charging, ahead of the occurrence of the side reaction, the metal ions having a lower potential are reduced to thereby suppress generation of hydrogen in the negative electrode. As a result, the occurrence of the above-described problems (1) to (3) can be suppressed and the capacity of the battery at the highest level of state of charge can be increased to a value close to 100% of the theoretical capacity. Thus, a redox flow battery having a high energy density is provided. PTL 1 describes, as examples of metal ions having a lower potential than vanadium ions, chromium (Cr) ions and zinc (Zn) ions.

However, even in the case of using the redox flow battery of PTL 1, in some cases, hydrogen is generated. In short, there is a possibility that the factors that cause generation of hydrogen are not completely identified.

Accordingly, an object of the present invention is to provide an electrolyte for a redox flow battery, the electrolyte allowing suppression of generation of hydrogen. Another object of the present invention is to provide a redox flow battery including this electrolyte for a redox flow battery.

Solution to Problem

The invention of the present application provides an electrolyte for a redox flow battery, wherein a total concentration of platinum-group element ions is 4.5 mass ppm or less.

Advantageous Effects of Invention

This electrolyte for a redox flow battery allows suppression of generation of hydrogen in a redox flow battery.

DESCRIPTION OF EMBODIMENTS

[Description of Embodiments According to the Invention of the Present Application]

Features of embodiments according to the invention of the present application will be first described in sequence.

(A) An embodiment provides an electrolyte for a redox flow battery (hereafter referred to as an RF electrolyte), wherein a total concentration of platinum-group element ions is 4.5 mass ppm or less.

The inventors of the present invention have found that generation of hydrogen during a battery reaction of a redox flow battery (hereafter referred to as an RF battery) is considerably influenced by the types and concentrations of impurity element ions in the RF electrolyte. In particular, the inventors have found that, when the total concentration (total amount) of platinum-group element ions is a certain value or more, generation of hydrogen is promoted; and, by specifying this total amount, generation of hydrogen can be suppressed. Thus, the RF electrolyte according to this embodiment also allows suppression of generation of hydrogen, which results in an increase in the energy density of the RF battery.

Herein, the term "element ions" collectively encompasses ions of any valence generated from the same element. Similarly, the term "concentration" denotes a total concentration of ions of any valence generated from the same element. The term "impurity element ions" denotes element ions that are contained in the RF electrolyte and do not contribute to any battery reaction. Accordingly, element ions encompass an active material; however, the active material, which contributes to a battery reaction, is not encompassed in impurity element ions. The platinum-group element ions, which do not contribute to any battery reaction, are impurity element ions. The term "platinum-group elements" collectively encompasses ruthenium (Ru), rhodium (Rh), palladium (Pd), osmium (Os), iridium (Ir), and platinum (Pt).

(B) The platinum-group element ions preferably satisfy at least one of (1) to (4) below in terms of concentration:

(1) a concentration of rhodium (Rh) ions is 1 mass ppm or less, (2) a concentration of palladium (Pd) ions is 1 mass ppm or less, (3) a concentration of iridium (Ir) ions is 1 mass ppm or less, and (4) a concentration of platinum (Pt) ions is 1 mass ppm or less.

Among platinum-group element ions, in particular, the above-described platinum-group element ions tend to promote generation of hydrogen. Accordingly, the concentrations of these platinum-group element ions in the RF electrolyte are adjusted to thereby suppress generation of hydrogen during a battery reaction, in particular, during the end phase of charging. As a result, the active material utilization can be increased to thereby increase the energy density of the RF battery.

(C) In the RF electrolyte according to any one of the embodiments (A) and (B), preferably, a concentration of V ions is 1 mol/L or more and 3 mol/L or less, a concentration of free sulfuric acid is 1 mol/L or more and 4 mol/L or less, a concentration of phosphoric acid is $1.0 \times 10^{-4}$ mol/L or more and $7.1 \times 10^{-1}$ mol/L or less, a concentration of ammonium is 20 mass ppm or less, and a concentration of silicon is 40 mass ppm or less.

An RF electrolyte having such a composition can suppress generation of hydrogen during a battery reaction, in particular, during the end phase of charging. As a result, the active material utilization can be increased to thereby increase the energy density of the RF battery. In addition, as described below, the RF electrolyte having such a composition can suppress generation of precipitate during a battery reaction and, as a result, can suppress degradation of battery performance over time.

(D) An RF battery according to an embodiment includes the RF electrolyte according to any one of the embodiments (A) to (C).

The RF battery according to this embodiment includes the RF electrolyte in which generation of hydrogen is suppressed. As a result, degradation of battery performance over time can be suppressed and the RF battery can have a high energy density.

[Details of Embodiments According to the Invention of the Present Application]

RF electrolytes according to embodiments of the invention of the present application will be described below with reference to the drawing. However, the present invention is not limited to these embodiments. The scope of the present invention is indicated by Claims and is intended to embrace all the modifications within the meaning and range of equivalency of the Claims.

Figure 1:
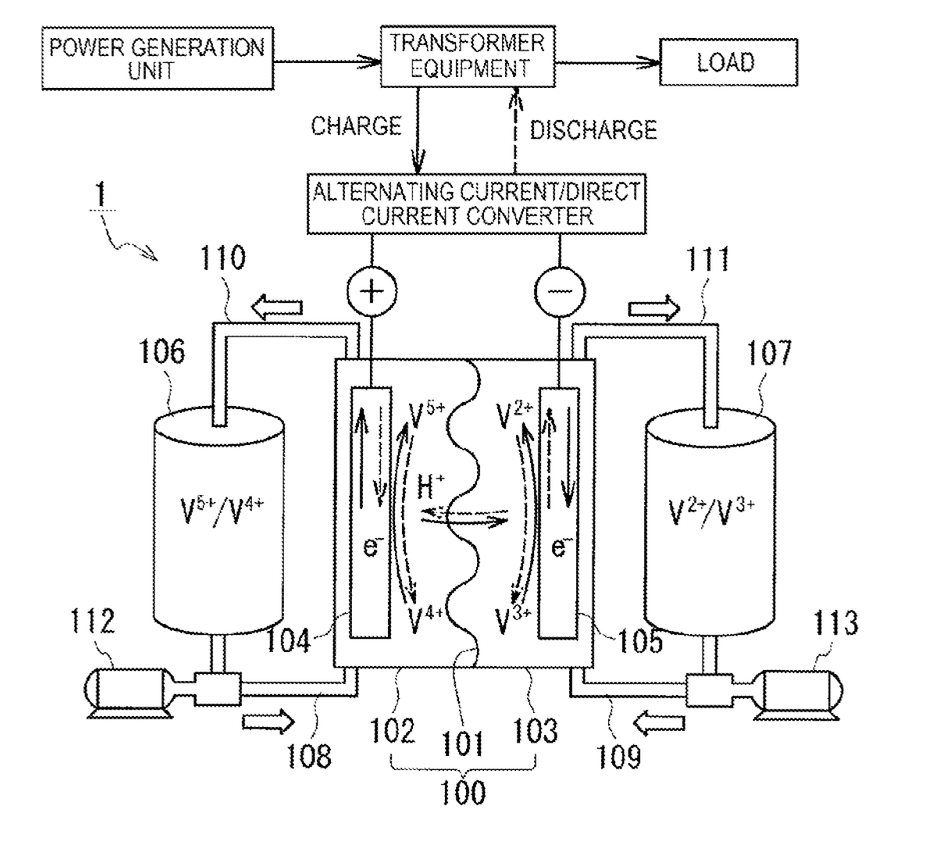
FIG. 1 illustrates the principle of operation of a redox flow battery.

Referring to FIG. 1, an RF battery and an RF electrolyte according to embodiments will be described with, as an example, an RF battery 1 employing V ions as a positive electrode active material and a negative electrode active material. In FIG. 1, solid-line arrows indicate changes in valence during charging and broken-line arrows indicate changes in valence during discharging. FIG. 1 indicates only representative valences of the active materials (V ions) and the active materials may have valences other than those indicated in FIG. 1. An active material other than V ions may be contained.

<Overall Configuration of RF Battery>

Representatively, the RF battery 1 is connected via an alternating current/direct current converter to an intermediate position between a power generation unit (for example, a solar photovoltaic power generator, a wind power generator, or another ordinary power plant) and a load (for example, a consumer). The RF battery 1 is charged with power generated by the power generation unit to thereby store the power, or is discharged to provide the stored power to the load. As with existing RF batteries, the RF battery 1 includes a battery cell 100 and a circulation mechanism (tanks, ducts, pumps) for supplying electrolytes to the battery cell 100.

(Battery Cell and Circulation Mechanism)

The battery cell 100 in the RF battery 1 includes a positive electrode cell 102 having a positive electrode 104 therein, a negative electrode cell 103 having a negative electrode 105 therein, and a membrane 101 separating the cells 102 and 103 from each other and being permeable to ions. The positive electrode cell 102 is connected to a positive electrode tank 106 storing a positive electrode electrolyte, through ducts 108 and 110. The negative electrode cell 103 is connected to a negative electrode tank 107 storing a negative electrode electrolyte, through ducts 109 and 111. The ducts 108 and 109 are equipped with pumps 112 and 113 for circulating the electrolytes for the electrodes, respectively. In the battery cell 100, the positive electrode electrolyte in the positive electrode tank 106 and the negative electrode electrolyte in the negative electrode tank 107 are supplied to the positive electrode cell 102 (positive electrode 104) and the negative electrode cell 103 (negative electrode 105) by circulation, respectively, through the ducts 108 to 111 and with the pumps 112 and 113, to charge and discharge the battery through changes in the valence of metal ions (V ions in this embodiment) serving as active materials in the electrolytes at the electrodes.

The battery cell 100 is normally used in a form referred to as a cell stack in which a plurality of cells are stacked. Each cell includes, as components, the positive electrode 104 (positive electrode cell 102), the negative electrode 105 (negative electrode cell 103), and the membrane 101. For the cell stack, cell frames are used: each cell frame includes a bipolar plate (not shown), on one surface of which the positive electrode 104 is to be disposed and on another surface of which the negative electrode 105 is to be disposed; and a frame (not shown) having liquid supply holes for supplying the electrolytes and liquid drainage holes for draining the electrolytes, and formed on the periphery of the bipolar plate. By stacking a plurality of cell frames, the liquid supply holes and the liquid drainage holes form fluid paths for the electrolytes. The fluid paths are connected to the ducts 108 to 111. The cell stack is structured by stacking a cell frame, the positive electrode 104, the membrane 101, the negative electrode 105, a cell frame, . . . , in this order. The basic structure of the RF battery may be appropriately selected from known structures.
(RF Electrolyte)

The RF electrolyte of this embodiment is a liquid in which element ions serving as an active material are contained within a solvent; and the liquid contains, at a very low concentration, platinum-group element ions. In addition, as is obvious from Test examples described below, if necessary, the concentrations of impurity element ions contributing to generation of precipitate can be set to predetermined values or less. In this embodiment, as the positive electrode electrolyte and the negative electrode electrolyte, an RF electrolyte containing V ions as the active material is used. In these positive electrode electrolyte and negative electrode electrolyte, V ions preferably have an average valence of 3.3 or more and 3.7 or less and the concentration of V ions is preferably 1 mol/L or more and 3 mol/L. More preferably, the average valence is 3.4 or more and 3.6 or less and the concentration of V ions is 1.5 mol/L or more and 1.9 mol/L or less.

The solvent of the RF electrolyte may be, for example, an aqueous solution of at least one selected from $H_2SO_4$, $K_2SO_4$, $Na_2SO_4$, $H_3PO_4$, $H_4P_2O_7$, $K_2HPO_4$, $Na_3PO_4$, $K_3PO_4$, $HNO_3$, $KNO_3$, HCl, and $NaNO_3$. Alternatively, the solvent of the RF electrolyte may be an organic acid solvent.
[Platinum-Group Element Ions]

The inventors of the present invention performed studies and, as a result, have found the following findings: when the total concentration of platinum-group element ions in an RF electrolyte is set to 4.5 mass ppm or less, generation of hydrogen can be effectively suppressed. The inventors have also found that platinum-group element ions described below particularly promote generation of hydrogen; and the concentrations of these platinum-group element ions preferably satisfy concentrations also described below.

(1) Rh ions: 1 mass ppm or less
(2) Pd ions: 1 mass ppm or less
(3) Ir ions: 1 mass ppm or less
(4) Pt ions: 1 mass ppm or less

[Adjustment of Concentration of Impurity Element Ions]

In order to prepare an RF electrolyte in which the total concentration of impurity element ions has been adjusted, it is preferable to use a raw material of the active material and a solvent (for example, sulfuric acid) that have a minimum content of impurity element ions. However, for example, during production steps, impurity element ions may enter an RF electrolyte. Accordingly, if necessary, the total concentration of impurity element ions may be decreased by subjecting an RF electrolyte to a known process such as coagulating sedimentation, solvent extraction, filtration using ion-exchange resin or chelate resin, electrolytic deposition, or membrane separation. In particular, filtration using chelate resin is preferred because, by adjusting properties of the chelate resin or pH of an RF electrolyte, specific element ions can be selectively filtered off. The filtration may be performed by passing an RF electrolyte through, for example, a filter of chelate resin or a column packed with beads of chelate resin.
[Another Classification]

The inventors of the present invention have found the following findings: when platinum-group element ions are classified into element ions belonging to group 9 (group 9 element ions), element ions belonging to group 10 (group 10 element ions), and element ions belonging to other groups (hereafter referred to as other-group element ions), the group 9 element ions and the group 10 element ions preferably satisfy certain total concentrations.

The group 9 element ions and the group 10 element ions encompass platinum-group element ions promoting generation of hydrogen. Since elements in the same group have similar properties, they can be often removed under the same (single) condition during removal of impurity element ions from an RF electrolyte. In the case where it is difficult to remove group 9 element ions or group 10 element ions, the total concentration of element ions of a group that are easily removed may be adjusted. Accordingly, in the case of this classification, it is not necessary to change conditions in order to remove ions of individual elements.

Thus, this classification allows efficient production of an RF electrolyte. In this case, in an RF electrolyte in which the total concentration of platinum-group element ions is 4.5 mass ppm or less, platinum-group element ions preferably satisfy at least one of (a) and (b) below:

(a) the total concentration of group 9 element ions is 2 mass ppm or less, and
(b) the total concentration of group 10 element ions is 2 mass ppm or less.

This is because generation of hydrogen in RF batteries can be effectively suppressed.

In addition, when a group constituted by platinum-group element ions and impurity element ions contributing to generation of precipitate described below is classified into group 9, group 10, and other groups, satisfying at least one of the total concentration in (a) above being 4 mass ppm or less and the total concentration in (b) above being 7 mass ppm or less can suppress generation of hydrogen and also generation of precipitate.
[Others]

In the case where an RF electrolyte contains vanadium as the active material and sulfuric acid as the solvent, preferably, the concentration of V ions is 1 mol/L or more and 3 mol/L or less, the concentration of free sulfuric acid is 1 mol/L or more and 4 mol/L or less, the concentration of phosphoric acid is $1.0 \times 10^{-4}$ mol/L or more and $7.1 \times 10^{-1}$ mol/L or less, the concentration of ammonium ($NH_4$) is 20 mass ppm or less, and the concentration of silicon (Si) is 40 mass ppm or less.

By setting the concentration of V ions and the concentration of free sulfuric acid so as to satisfy the above-described specific ranges, the average valence in the RF electrolyte becomes about 3.3 or more and about 3.7 or less. The RF electrolyte satisfying such an average valence is, as a positive electrode electrolyte and also as a negative electrode electrolyte, highly balanced in terms of concentrations of V ions of individual valences. Accordingly, an RF battery employing an RF electrolyte satisfying such an average valence can have a very high capacity. In addition, by setting the concentration of phosphoric acid to be in the above-described specific range and by setting the concentration of $NH_4$ to the above-described specific concentration or less, precipitation of precipitate (for example, ammonium-vanadium compound) during a battery reaction can be suppressed. Furthermore, since Si may cause an adverse effect on the membrane, the concentration of Si is set to the above-described specific concentration or less, so that the adverse effect can be suppressed.
(Tanks and Ducts)

The positive electrode tank 106, the negative electrode tank 107, and the ducts 108 to 111 are members that come into contact with the RF electrolyte. Accordingly, these members (106 to 111) may contain or have thereon impurity element ions contributing to generation of precipitate during a battery reaction or platinum-group element ions. In such a case, as the RF battery 1 is operated, there may be an increase in the contents of the impurity element ions and the platinum-group element ions in the RF electrolyte. For this reason, these members (106 to 111) are preferably formed of materials that do not contain the impurity element ions or the platinum-group element ions. In addition, the steps of producing these members (106 to 111) are preferably performed with things that do not contain the impurity element ions or the platinum-group element ions (for example, a release agent for molds for producing the members, the release agent not containing the impurity element ions or the platinum-group element ions). Examples of the materials forming the members (106 to 111) include an ethylene homopolymer that has a density (ASTM D 1505) within a range of 0.080 g/cm$^3$ or more and 0.960 g/cm$^3$ or less and has a melt flow rate (ASTM D 1238, measurement conditions: 190° C., load of 2.16 kg) within a range of 0.01 g/10 min or more and 20 g/10 min or less; and an ethylene-α olein copolymer having a density and a melt flow rate that fall within the above-described ranges. These descriptions of the members (106 to 111) similarly apply to transport tanks for transporting the RF electrolyte.

TEST EXAMPLE 1

In Test example 1, charge and discharge tests were performed in consideration of RF batteries practically used. A positive electrode and a negative electrode having an electrode area of 500 cm$^2$ and formed of carbon felt were prepared. The total mass of these electrodes was about 35 g. Regarding RF electrolytes, three RF electrolytes having different concentrations of impurity element ions were prepared. These RF electrolytes were used to produce RF batteries of three types having a 2-hour capacity. The prepared RF electrolytes have the following common basic composition.
(Common Basic Composition)
  Concentration of V ions: 1.7 mol/L
  Average valence of V ions: 3.5
  Concentration of free sulfuric acid: 2.0 mol/L
  Concentration of phosphoric acid: 0.14 mol/L
  Concentration of silicon: 40 mass ppm or less
  Concentration of ammonium: 20 mass ppm or less
Table I describes the concentrations of impurity element ions of the RF electrolytes used in this Test example. The values in Table I are concentrations (mass ppm). The concentrations of impurity element ions were adjusted, when necessary, by passing RF electrolytes through columns packed with chelate resin. The concentrations of the impurity element ions were measured as follows. The concentrations of Cl ions was measured with an ion chromatography system (manufactured by NIPPON DIONEX K. K., ICS-1500). The concentrations of Na ions and K ions were measured with a polarized Zeeman atomic absorption spectrophotometer (manufactured by Hitachi High-Tech Fielding Corporation, Z-6100). The concentrations of the other impurity element ions were measured with an ICP emission spectrometer (manufactured by SHIMADZU CORPORATION, ICPS-8100) or an ICP mass spectrometer (manufactured by Agilent Technologies. Inc., Agilent 7700 ICP-MS).

TABLE I

| | Test example | | |
|---|---|---|---|
| | 1-1 | 1-2 | 1-3 |
| Na | 25.1 | 28.1 | 31.5 |
| Mg | 18.9 | 17.5 | 22.4 |
| Al | 11.4 | 14.1 | 17.5 |
| Cl | 18.5 | 19 | 24.5 |
| K | 19 | 15.5 | 21.8 |
| Ca | 16.5 | 20.5 | 34.8 |
| Cr | 9.5 | 8.5 | 11.4 |
| Mn | 0.8 | 0.8 | 1.2 |
| Fe | 32.5 | 38 | 42.5 |
| Co | 1.5 | 1.8 | 3.5 |
| Ni | 1 | 4.4 | 6.1 |
| Cu | 0.5 | 0.9 | 1.5 |
| Zn | 0.7 | 0.7 | 1.8 |
| As | 0.9 | 0.8 | 2.1 |
| Mo | 19 | 14.5 | 22.4 |
| Rh | 0.9 | 0.9 | 1.2 |
| Pd | 0.8 | 0.5 | 1.1 |
| Sb | 0.9 | 0.6 | 1.2 |
| Ir | 0.5 | 0.8 | 1.2 |
| Pt | 0.4 | 0.7 | 1.5 |
| Total | 179.3 | 188.6 | 251.2 |
| Generation of precipitate | Not occurred | Not occurred | Occurred |
| Increase in cell resistance | Not occurred | Not occurred | Occurred |
| Generation of hydrogen | Not occurred | Not occurred | Occurred |

* Values in Table are given in units of mass ppm

Each RF battery was subjected to a charge and discharge test for 20 cycles and determined as to whether generation of precipitate, an increase in battery resistance (cell resistance), and generation of hydrogen occurred. The generation of precipitate was observed by visual inspection. The generation of hydrogen was detected with a combustible gas detector (manufactured by New Cosmos Electric Co., Ltd., XP-311A). Regarding the cell resistance, an average voltage and an average current during charge and discharge were measured and the cell resistance was determined as average voltage/average current. The cell resistance in the first cycle was compared with the cell resistance in the final cycle to thereby determine as to whether the cell resistance increased. The charge and discharge conditions were as follows.
(Charge and Discharge Conditions)
  Charge-discharge mode: constant current
  Current density: 70 (mA/cm$^2$)
  End-of-charge voltage: 1.55 (V)
  End-of-discharge voltage: 1.00 (V)
  Temperature: 25° C.
Table I indicates that, in the tests, in Test example 1-1 and Test example 1-2 in which the total concentration of impurity element ions was 190 mass ppm or less, no generation of hydrogen was detected, and no generation of precipitate and no increase in cell resistance were observed. In contrast, regarding the RF electrolyte used in Test example 1-3 in which the total concentration of impurity element ions was more than 250 mass ppm, generation of hydrogen in the negative electrode was detected and generation of precipitate in the positive electrode and an increase in cell resistance were also observed. In summary, it has been demonstrated that the amount of impurity element ions affects generation of hydrogen and generation of precipitate.

TEST EXAMPLE 2

In view of results of Test example 1, in order to identify, among impurity element ions, those promoting generation of hydrogen, the impurity element ions were classified into metal elements and non-metal elements. Furthermore, the metal elements were classified into heavy metal elements and light metal elements, and the heavy metal elements were classified into platinum-group elements and other elements. A plurality of electrolytes were prepared so as to have different total concentrations in terms of element ions of these classifications and were studied as to which classification promotes generation of hydrogen. Table II to Table IV describe the concentrations of impurity element ions of the RF electrolytes used in this Test example. The values in Tables are concentrations (mass ppm). The manner in which the concentrations of impurity element ions were adjusted and the charge and discharge conditions were the same as in Test example 1.

TABLE II

| | | | | Test example | | | | | | | | | |
|---|---|---|---|---|---|---|---|---|---|---|---|---|---|
| | | | | 2-1 | 2-2 | 2-3 | 2-4 | 2-5 | 2-6 | 2-7 | 2-8 | 2-9 | 2-10 |
| Metal | Heavy metal | Platinum group | Total 1 | 4.5 or less | 4.5 or less | 4.5 or less | 4.5 or less | 4.5 or less | 4.5 or less | 4.5 or less | 4.5 or less | 4.5 or less | 4.5 or less |
| | | Other than Platinum Group | Cr | 8 | 9 | 8 | 5 | 13.4 | 12.7 | 12.4 | 11.7 | 13.5 | 11.5 |
| | | | Mn | 0.8 | 0.8 | 0.7 | 0.5 | 3.7 | 2.1 | 1.5 | 1.2 | 2.1 | 2.3 |
| | | | Fe | 35 | 38 | 30 | 36 | 45.5 | 40.5 | 42.1 | 41.2 | 22.4 | 40.5 |
| | | | Co | 1 | 1.5 | 1.2 | 1.4 | 4.5 | 4.2 | 3.1 | 2.5 | 3.1 | 2.3 |
| | | | Ni | 4 | 4.2 | 3.8 | 4 | 8.8 | 5.3 | 5.5 | 5.8 | 5.6 | 5.4 |
| | | | Cu | 0.7 | 0.8 | 0.6 | 0.6 | 2.9 | 3 | 1.3 | 1.1 | 1.3 | 1.3 |
| | | | Zn | 0.5 | 0.7 | 0.6 | 0.6 | 2.4 | 1.8 | 1.2 | 2.1 | 1.4 | 1.8 |
| | | | Mo | 16 | 18 | 15 | 16 | 21.9 | 23 | 21.8 | 20.5 | 21.5 | 20.7 |
| | | | Sb | 0.8 | 0.9 | 0.7 | 0.8 | 2.4 | 1.2 | 1.5 | 1.8 | 1.8 | 2 |
| | | | Total 2 | 66.8 | 73.9 | 60.6 | 64.9 | 105.5 | 93.8 | 90.4 | 87.9 | 72.7 | 87.8 |
| | Light Metal | | Na | 20 | 27 | 34.5 | 31 | 19.8 | 26.5 | 31 | 30.5 | 31 | 28.1 |
| | | | Mg | 15 | 18 | 21.4 | 23.5 | 13.7 | 16.8 | 21.2 | 22 | 20.5 | 13.4 |
| | | | Al | 10 | 13 | 15.8 | 16 | 12.5 | 13.2 | 16.1 | 16.6 | 16.7 | 14.2 |
| | | | K | 15 | 16 | 22.7 | 22.5 | 12.4 | 16.6 | 21.4 | 21 | 21.3 | 11.4 |
| | | | Ca | 26 | 28 | 34.6 | 36.1 | 24.1 | 21.7 | 30.5 | 31 | 31.6 | 31.4 |
| | | | Total 3 | 86 | 102 | 129 | 129.1 | 82.5 | 94.8 | 120.2 | 121.1 | 121 | 98.5 |
| | Total 2 + Total 3 | | | 152.8 | 175.9 | 189.6 | 194 | 188 | 188.6 | 210.6 | 209 | 193.7 | 186.3 |
| Non-metal | | | Cl | 15 | 18 | 23 | 21 | 25 | 22.2 | 4.8 | 4 | 20.5 | 21.6 |
| | | | As | 0.8 | 0.8 | 1.5 | 1.8 | 2 | 1.5 | 0.7 | 0.6 | 1.3 | 2.1 |
| | | | Total 4 | 15.8 | 18.8 | 24.5 | 22.8 | 27 | 23.7 | 5.5 | 4.6 | 21.8 | 23.7 |
| Total 2 + Total 3 + Total 4 | | | | 168.6 | 194.7 | 214.1 | 218.8 | 215 | 212.3 | 216.1 | 213.6 | 215.5 | 210 |
| Generation of precipitate | | | | Not occurred | Not occurred | Not occurred | Not occurred | Not occurred | Not occurred | Not occurred | Not occurred | Not occurred | Not occurred |
| Increase in cell resistance | | | | Not occurred | Not occurred | Not occurred | Not occurred | Not occurred | Not occurred | Not occurred | Not occurred | Not occurred | Not occurred |
| Generation of hydrogen | | | | Not occurred | Not occurred | Not occurred | Not occurred | Not occurred | Not occurred | Not occurred | Not occurred | Not occurred | Not occurred |

* Values in Table are given in units of mass ppm

TABLE III

| | | | | Test example | | | | | | | | | |
|---|---|---|---|---|---|---|---|---|---|---|---|---|---|
| | | | | 2-11 | 2-12 | 2-13 | 2-14 | 2-15 | 2-16 | 2-17 | 2-18 | 2-19 | 2-20 |
| Metal | Heavy metal | Platinum group | Total 1 | 4.5 or less | 4.5 or less | 4.5 or less | 4.5 or less | 4.5 or less | 4.5 or less | 4.5 or less | 4.5 or less | 4.5 or less | 4.5 or less |
| | | Other than Platinum Group | Cr | 13 | 11.3 | 9 | 16 | 11.3 | 11.5 | 32 | 11.5 | 14.2 | 15.1 |
| | | | Mn | 2 | 3 | 0.5 | 4.1 | 2.4 | 2.5 | 2.4 | 1.2 | 2.1 | 2.2 |
| | | | Fe | 41 | 43 | 39 | 42 | 50.5 | 44.2 | 43.4 | 28.7 | 45.4 | 45 |
| | | | Co | 2.3 | 3 | 1 | 3.5 | 3.8 | 3 | 2.4 | 2.4 | 2.4 | 2.3 |
| | | | Ni | 5.5 | 6.3 | 4.5 | 8 | 9.7 | 7 | 7.1 | 5.1 | 6.1 | 6.2 |
| | | | Cu | 1.5 | 2 | 0.8 | 1.7 | 3.2 | 1.9 | 1.2 | 5.6 | 1.2 | 1.4 |
| | | | Zn | 1.3 | 1.5 | 0.7 | 2.2 | 4.6 | 1.6 | 2.1 | 2.4 | 1.8 | 1.7 |
| | | | Mo | 22 | 24 | 18 | 7 | 31.2 | 28.1 | 22.4 | 20.5 | 20.5 | 21 |
| | | | Sb | 1.2 | 1.3 | 0.7 | 1.4 | 5.4 | 1.4 | 1.2 | 1.8 | 1.9 | 1.8 |
| | | | Total 2 | 89.8 | 95.4 | 74.2 | 85.9 | 122.1 | 101.2 | 114.2 | 79.2 | 95.6 | 96.7 |

TABLE III-continued

| | | Test example | | | | | | | | | |
|---|---|---|---|---|---|---|---|---|---|---|---|
| | | 2-11 | 2-12 | 2-13 | 2-14 | 2-15 | 2-16 | 2-17 | 2-18 | 2-19 | 2-20 |
| Light Metal | Na | 31.9 | 31.5 | 33.5 | 37.4 | 15.7 | 41.2 | 31.9 | 34 | 10.4 | 31 |
| | Mg | 22.4 | 22.2 | 22.5 | 28.1 | 10.2 | 35.5 | 22.7 | 21.7 | 22 | 21.5 |
| | Al | 18.5 | 16.5 | 16.4 | 16.5 | 11.8 | 28.9 | 16.8 | 16.8 | 19.4 | 19.8 |
| | K | 25 | 21 | 20.6 | 22.4 | 14.6 | 34.5 | 25.5 | 27.9 | 22.4 | 22.8 |
| | Ca | 34.8 | 31.5 | 31.8 | 31.9 | 22.2 | 31.7 | 31.4 | 35.4 | 41.7 | 42.4 |
| | Total 3 | 132.6 | 122.7 | 124.8 | 138.3 | 74.5 | 171.8 | 128.3 | 135.8 | 115.9 | 137.5 |
| Total 2 + Total 3 | | 222.4 | 218.1 | 199 | 222.2 | 196.6 | 273 | 242.5 | 215 | 211.5 | 234.2 |
| Non-metal | Cl | 22 | 20.5 | 24 | 24.6 | 24 | 21 | 18.5 | 24.4 | 28 | 27.5 |
| | As | 1.3 | 1.1 | 1.4 | 1.4 | 2.1 | 1.1 | 0.9 | 1.4 | 1.4 | 1.5 |
| | Total 4 | 23.3 | 21.6 | 25.4 | 26 | 28.1 | 22.1 | 19.4 | 25.8 | 29.4 | 29 |
| Total 2 + Total 3 + Total 4 | | 245.7 | 239.7 | 224.4 | 248.2 | 222.7 | 295.1 | 261.9 | 240.8 | 240.9 | 263.2 |
| Generation of precipitate | | Occurred | Occurred | Occurred | Occurred | Occurred | Occurred | Occurred | Occurred | Occurred | Occurred |
| Increase in cell resistance | | Occurred | Occurred | Occurred | Occurred | Occurred | Occurred | Occurred | Occurred | Occurred | Occurred |
| Increase in cell resistance | | Not occurred | Not occurred | Not occurred | Not occurred | Not occurred | Not occurred | Not occurred | Not Occurred | Not occurred | Not occurred |

*Values in Table are given in units of mass ppm

TABLE IV

| | | Test example | | | | | | |
|---|---|---|---|---|---|---|---|---|
| | | 2-21 | 2-22 | 2-23 | 2-24 | 2-25 | 2-26 | 2-27 |
| Platinum group | Rh | 0.5 | 0.8 | 1.2 | 1.1 | 1.1 | 1.5 | 1.4 |
| | Pd | 0.5 | 0.9 | 1.1 | 1.1 | 1.2 | 1.2 | 1.3 |
| | Ir | 0.5 | 0.9 | 0.5 | 1.2 | 1.3 | 0.8 | 0.7 |
| | Pt | 0.5 | 0.9 | 1.1 | 0.6 | 1.2 | 1.3 | 1.2 |
| | Total | 2 | 3.5 | 3.9 | 4 | 4.8 | 4.8 | 4.6 |
| Total of the others | | 220 or less | 220 or less | 220 or less | 220 or less | 220 or less | 220 or less | 220 or less |
| Generation of precipitate | | Not occurred | Not occurred | Not occurred | Not occurred | Not occurred | Not occurred | Not occurred |
| Increase in cell resistance | | Not occurred | Not occurred | Not occurred | Not occurred | Not occurred | Not occurred | Not occurred |
| Increase in cell resistance | | Not occurred | Not occurred | Not occurred | Not occurred | Occurred | Occurred | Occurred |

*Values in Table are given in units of mass ppm

Table II to Table IV indicate that, from the tests in which impurity element ions were classified in the above-described manner, platinum-group element ions contribute to generation of hydrogen and the other impurity element ions contribute to generation of precipitate.

In addition, Table I to Table IV indicate the following facts.
When the total concentration of platinum-group element ions is 4.5 mass ppm or less, generation of hydrogen can be suppressed.
When the total concentration of impurity element ions contributing to generation of precipitate is 220 mass ppm or less, generation of precipitate can be suppressed.
Among impurity element ions contributing to generation of precipitate, the total concentration of metal element ions is preferably 195 mass ppm or less (for example, refer to Test example 2-4).
Among impurity element ions contributing to generation of precipitate, the total concentration of non-metal element ions is preferably 21 mass ppm or less (for example, refer to Test example 1-2).
Among impurity element ions contributing to generation of precipitate, the total concentration of heavy metal element ions is preferably 85 mass ppm or less (for example, refer to and compare Test example 1-2 and Test example 1-3).
Among impurity element ions contributing to generation of precipitate, the total concentration of light metal element ions is preferably 120 mass ppm or less (for example, refer to and compare Test example 1-2 and Test example 1-3).
Among impurity element ions contributing to generation of precipitate, the total concentration of heavy metal element ions is preferably 85 mass ppm or less, and the total concentration of light metal element ions is preferably 120 mass ppm or less (for example, refer to Test example 2-2).
The impurity element ions preferably satisfy those described below (for example, refer to Table I.
(1) Rh ions: 1 mass ppm or less, (2) Pd ions: 1 mass ppm or less, (3) Ir ions: 1 mass ppm or less, (4) Pt ions: 1 mass ppm or less, (5) Cr ions: 10 mass ppm or less, (6) Mn ions: 1 mass ppm or less, (7) Fe ions: 40 mass ppm or less, (8) Co ions: 2 mass ppm or less, (9) Ni ions: 5 mass ppm or less, (10) Cu ions: 1 mass ppm or less, (11) Zn ions: 1 mass ppm or less, (12) Mo ions: 20 mass ppm or less, (13) Sb ions: 1 mass ppm or less, (14) Na ions: 30 mass ppm or less, (15) Mg ions: 20 mass ppm or less, (16) Al ions: 15 mass ppm or less, (17) K ions: 20 mass ppm or less, (18) Ca ions: 30 mass ppm or less, (19) Cl ions: 20 mass ppm or less, (20) As ions: 1 mass ppm or less Table V below describes results of cases where element ions in a group constituted by platinum-group element ions and impurity element ions contributing to generation of precipitate were classified into group 9 element ions, group 10 element ions, and other-group element ions.

TABLE V

|  |  | Test example | | |
|---|---|---|---|---|
|  |  | 1-1 | 1-2 | 1-3 |
| Group 9 | Co | 1.5 | 1.8 | 3.5 |
|  | Rh | 0.9 | 0.9 | 1.2 |
|  | Ir | 0.5 | 0.8 | 1.2 |
|  | Total 1 | 2.9 | 3.5 | 5.9 |
| Group 10 | Ni | 1 | 4.4 | 6.1 |
|  | Pd | 0.8 | 0.5 | 1.1 |
|  | Pt | 0.4 | 0.7 | 1.5 |
|  | Total 2 | 2.2 | 5.6 | 8.7 |
| Other groups | Na | 25.1 | 28.1 | 31.5 |
|  | Mg | 18.9 | 17.5 | 22.4 |
|  | Al | 11.4 | 14.1 | 17.5 |
|  | Cl | 18.5 | 19 | 24.5 |
|  | K | 19 | 15.5 | 21.8 |
|  | Ca | 16.5 | 20.5 | 34.8 |
|  | Cr | 9.5 | 8.5 | 11.4 |
|  | Mn | 0.8 | 0.8 | 1.2 |
|  | Fe | 32.5 | 38 | 42.5 |
|  | Cu | 0.5 | 0.9 | 1.5 |
|  | Zn | 0.7 | 0.7 | 1.8 |
|  | As | 0.9 | 0.8 | 2.1 |
|  | Mo | 19 | 14.5 | 22.4 |
|  | Sb | 0.9 | 0.6 | 1.2 |
|  | Total 3 | 174.2 | 179.5 | 236.6 |
| Total 1 + Total 2 + Total 3 | | 179.3 | 188.6 | 251.2 |
| Generation of precipitate | | Not occurred | Not occurred | Occurred |
| Increase in cell resistance | | Not occurred | Not occurred | Occurred |
| Generation of hydrogen | | Not occurred | Not occurred | Occurred |

* Values in Table are given in units of mass ppm

Table V indicates that, when the total concentration of platinum-group element ions is 4.5 mass ppm or less, generation of hydrogen can be suppressed; and, in addition, when the total of impurity element ions is 224.5 mass ppm or less, generation of hydrogen and generation of precipitate can be suppressed. When platinum-group element ions are classified into group 9 element ions, group 10 element ions, and other-group element ions, at least one of the following can be satisfied: the total concentration of group 9 element ions is 2 mass ppm or less and the total concentration of group 10 element ions is 2 mass ppm or less. When impurity element ions are classified into group 9 element ions, group 10 element ions, and other-group element ions, at least one of the following can be satisfied: the total concentration of group 9 element ions is 4 mass ppm or less, the total concentration of group 10 element ions is 7 mass ppm or less, and the total concentration of other-group element ions is 190 mass ppm or less.

Regarding the above-described descriptions, the following items are further disclosed.

(Appendix 1)

An electrolyte for a redox flow battery (RF electrolyte), wherein a total concentration of platinum-group element ions is 4.5 mass ppm or less, and platinum-group element ions satisfy at least one of (a) and (b) below:

(a) a total concentration of group 9 element ions is 2 mass ppm or less, and (b) a total concentration of group 10 element ions is 2 mass ppm or less.

(Appendix 2)

An electrolyte for a redox flow battery, wherein a total concentration of impurity element ions contributing to generation of precipitate during a battery reaction is 220 mass ppm or less, a total concentration of platinum-group element ions is 4.5 mass ppm or less, and when element ions in a group constituted by platinum-group element ions and impurity element ions contributing to generation of precipitate are classified into element ions belonging to group 9, element ions belonging to group 10, and element ions other than the element ions belonging to group 9 and the element ions belonging to group 10, at least one of (c) to (e) below is satisfied:

(c) a total concentration of the element ions belonging to group 9 is 4 mass ppm or less, (d) a total concentration of the element ions belonging to group 10 is 7 mass ppm or less, and (e) a total concentration of the element ions other than the element ions belonging to group 9 and the element ions belonging to group 10 is 190 mass ppm or less.

INDUSTRIAL APPLICABILITY

An electrolyte for a redox flow battery according to the present invention can be suitably used as an electrolyte of a redox flow battery, which is a secondary battery. A redox flow battery according to the present invention can be suitably used as a battery for load leveling or for voltage sag and power failure prevention.

REFERENCE SIGNS LIST

1 redox flow battery (RF battery)
100 battery cell
101 membrane
102 positive electrode cell
103 negative electrode cell
104 positive electrode
105 negative electrode
106 positive electrode tank
107 negative electrode tank
108 to 111 ducts
112, 113 pumps

The invention claimed is:

1. An electrolyte for a redox flow battery, comprising vanadium ions as an active material,
  wherein a total concentration of platinum-group element ions is greater than 0 mass ppm and is 4.5 mass ppm or less.

2. The electrolyte for a redox flow battery according to claim 1, wherein the platinum-group element ions satisfy at least one of (1) to (3) below in terms of concentration:

(1) a concentration of rhodium ions is 1 mass ppm or less,
(2) a concentration of palladium ions is 1 mass ppm or less, and
(3) a concentration of iridium ions is 1 mass ppm or less.

3. The electrolyte for a redox flow battery according to claim 1, wherein the platinum-group element ions satisfy (4) below in terms of concentration:
   (4) a concentration of platinum ions is 1 mass ppm or less.

4. The electrolyte for a redox flow battery according to claim 1, wherein a concentration of the vanadium ions is 1 mol/L or more and 3 mol/L or less, a concentration of free sulfuric acid is 1 mol/L or more and 4 mol/L or less, a concentration of phosphoric acid is $1.0 \times 10^{-4}$ mol/L or more and $7.1 \times 10^{-1}$ mol/L or less, a concentration of ammonium is 20 mass ppm or less, and a concentration of silicon is 40 mass ppm or less.

5. A redox flow battery comprising the electrolyte for a redox flow battery according to claim 1.

6. An electrolyte for a redox flow battery, comprising:
   vanadium ions as an active material; and
   platinum-group element ions;
   wherein a total concentration of platinum-group element ions is no greater than 4.5 mass ppm.

7. The electrolyte for a redox flow battery according to claim 6, wherein the platinum-group element ions satisfy at least one of (1) to (3) below in terms of concentration:
   (1) a concentration of rhodium ions is no greater than 1 mass ppm,
   (2) a concentration of palladium ions is no greater than 1 mass ppm, and
   (3) a concentration of iridium ions is no greater than 1 mass ppm.

8. The electrolyte for a redox flow battery according to claim 6, wherein the platinum-group element ions satisfy (4) below in terms of concentration:
   (4) a concentration of platinum ions is no greater than 1 mass ppm.

9. The electrolyte for a redox flow battery according to claim 6, wherein a concentration of the vanadium ions is 1 mol/L or more and 3 mol/L or less, a concentration of free sulfuric acid is 1 mol/L or more and 4 mol/L or less, a concentration of phosphoric acid is $1.0 \times 10^{-4}$ mol/L or more and $7.1 \times 10^{-1}$ mol/L or less, a concentration of ammonium is 20 mass ppm or less, and a concentration of silicon is 40 mass ppm or less.

10. A redox flow battery comprising the electrolyte for a redox flow battery according to claim 6.

\* \* \* \* \*